United States Patent

[11] 3,629,825

[72] Inventor Earl M. Bloom, Jr.
Endicott, N.Y.
[21] Appl. No. 881,240
[22] Filed Dec. 1, 1969
[45] Patented Dec. 21, 1971
[73] Assignee International Business Machines Corporation
Armonk, N.Y.

[54] ERROR-DETECTING SYSTEM FOR DATA-PROCESSING CIRCUITRY
6 Claims, 3 Drawing Figs.

Figure 1:
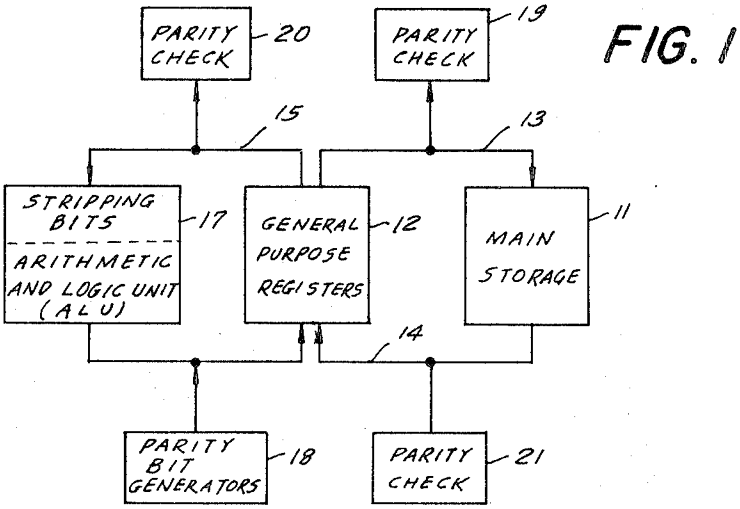

[52] U.S. Cl. .......... 340/146.1, 235/153
[51] Int. Cl. .......... G06f 11/08, G06f 11/12, G06f 11/10
[50] Field of Search .......... 235/153; 340/146.1

[56] References Cited
UNITED STATES PATENTS

| | | | |
|---|---|---|---|
| 3,144,635 | 8/1964 | Brown et al. | 340/146.1 |
| 3,163,848 | 12/1964 | Abramson | 235/153 X |
| 3,328,759 | 6/1967 | Blaauw et al. | 340/146.1 |

*Primary Examiner*—Malcolm A. Morrison
*Assistant Examiner*—James F. Gottman
*Attorneys*—Hanifin and Jancin and John C. Black ABSTRACT: This invention is directed to error detection circuitry for combination with data-processing systems. The information which comprises the message transmission is transmitted in binary fashion in channels each of a selected number of data bits, and through the addition of two check bits it is possible to detect both single and double parity errors of the asymmetric-type.

INVENTOR
EARL M. BLOOM, JR.
BY
ATTORNEY

ERROR-DETECTING SYSTEM FOR DATA-PROCESSING CIRCUITRY

This invention is directed to an asymmetric error detecting method and system adapted to message transmission of various lengths, where the information is in binary channels each of a selected number of data bits, by which it becomes possible to detect multiple, as well as single, asymmetric errors in transmission in cases where the information is derived from a binary channel in which the characters are either 0's or 1's.

It has been known in the past that error detection may be achieved through the use along with the data bits of information of a parity bit which is generated by either an odd or an even count of the number of data bits that happen to be present. Such a parity bit is generally known as a single parity bit which serves as the medium by which it becomes possible to detect any odd number of errors in the information. However, when an even number of errors happens to occur, such errors go undetected. With such a system detection of an odd parity error is achieved even if all bits, including the parity bits, are dropped. However, it could happen that where all bits are "picked" (that is, where the bit is erroneously introduced as contrast with it being suppressed), the error can go completely undetected. The inverse is also true if an "even" parity check is used.

When a code consisting of a combination of 1's and 0's is used to convey the information, the errors are usually the result of 1's being changed to 0's, or vice versa, but usually not both. To decode or encode the check-bit, a count of the number of 1's (or 0's) must be made.

It has also been proposed to detect most "even," as well as "odd," errors through the use of an additional parity bit and to detect "double" errors which come about due to a failure of two bits. When a double parity bit is generated any increase or decrease by two of the number of logical 1's in the data will be detected as an error.

The result is that while such double errors usually constitute only a small portion of the total errors, any correction of single errors has the effect of substantially increasing the susceptibility of the system to the double errors. By the form of systems heretofore known and used, these errors cannot be detected with any reasonably simple form of circuitry. Further than this, many errors are erroneously corrected, and in the process of correcting an error, for instance, a double error in another address in the same storage block can cause an erroneous correction of the original error.

An example of a table for identifying both single parity (SP) and double parity (DP) for eight data bits (usually termed "one byte") can be illustrated as follows:

| No. of 1's in Data | Single Parity (SP) | Double Parity (DP) |
|---|---|---|
| 0 | X | |
| 1 | | |
| 2 | X | X |
| 3 | | X |
| 4 | X | |
| 5 | | |
| 6 | X | X |
| 7 | | X |
| 8 | X | |

The logic required to generate and check double parity (DP) will herein be described and represents some additional circuitry over and above that which is required for single parity (SP), as will be apparent from what is to follow. The DP (double parity) bit in combination with the SP (single parity) bit will detect more than double errors. Multiple errors are normally a small percentage of the total errors, except in cases where the failure media is something that is common to all bits. A core array is an example where many factors are common to all bits, such as (a) DC voltages; (b) X–Y drive lines; (c) radiated noises; (d) an inhibit sample; (e) a sense-amp strobe; and (f) a sense-amp threshold level, as typical illustrations. A failure (intermittent or solid) of any one of these factors substantially increases the probabilities of a multiple error. For example, a solid failure of the inhibit sample will result in all 0's becoming 1's. This type of error has no chance of being caught by single parity only, while the combination of single parity and double parity will catch all errors of this type.

Broadly speaking, the invention contemplates apparatus in which data are stored, transferred, and/or processed. Such data may be in the form of a byte having binary data bit positions with which there is also combined each of a single parity and a double parity bit in selected positions. With this form of apparatus the end result is that there is included appropriate circuitry forms which provide a response to all data bit positions in each byte, so that any changes in an odd number of the data bits and the single parity bit are at once detectable. With this the circuitry becomes responsive to the logical bits in the data bit positions and in the double parity bit positions in order that asymmetric changes by the count of two of the logical one bits in such positions can be detected.

To achieve such end results there is a suitable bit generating means which will respond to the value of the binary bits in each data position of the bytes in order that there may be a selective addition of check bits in the single parity bit positions of the bytes. Then a generally similar effect is produced through selective addition of check bits in the double parity bit positions of the bytes under the control of a second bit generating means.

While the teachings of the present application are applicable to other storage devices, such as core storage, it is anticipated the greatest advantage will be attained in monolithically fabricated transistor storage devices because of higher anticipated error rates.

From what is to follow it will become apparent that the single and double parity checking methods can be used to check storages which operate on a multibyte basis without requiring additional planes. Further than this, it will likewise be appreciated that the apparatus and method herein to be further defined makes possible the expansion of this checking method to include, if desired and by following the principles that will herein be outlined, additional parity bits can be used to detect virtually every possible asymmetric error. Such approaches could be desirable for the purpose of checking storages on the so-called high-availability systems.

The particular system herein to be dealt with as one particular example of the general scope of the invention which will clearly establish that the double parity check, when considered with the single parity, is particularly adept and meritorious for checking control or main storages. In the case of error retry of control storage errors it is necessary to detect multiple errors immediately as opposed to catching them later as single errors, or even missing them entirely. In the case of error correction of main storage or control storage errors, although multiple errors are normally a small percentage of total errors, once single errors are corrected, the susceptibility to double errors is substantially increased.

Without double error detection, double errors cannot be corrected even though the correction technique is capable of correcting double errors. Likewise, without double error detection, single errors can be erroneously corrected. In the process of correcting a single error, some undetected errors (for instance, a double error) in another address in the same storage block can cause erroneous correction of the original error. Then, still further, by the system of the present invention the immediate detection of errors at their source serves to prevent error propogation.

The following description will make apparent that this invention contemplates the inclusion of circuit means which, when used with the two check bits set forth, make possible the detection of all single bit failures and all asymmetric double bit failures. In composite, the total types of errors detected by the circuitry herein to be set forth in explaining the invention and its operational principles will encompass the following:

(a) a detection of all errors which occur in an odd number of data and single parity bit positions; (b) a detection of all single and asymmetric double errors which occur in the data, single parity and double parity bit positions; (c) a detection of most errors which occur in an odd number of data, single and double parity bit positions; (d) a detection of most asymmetric errors which occur in an even number of data, single and double parity bit positions.

With the foregoing in mind it comes an object of the present invention to provide error-detecting circuitry which will insure the detection of all asymmetric double errors with the minimum circuitry and circuitry which is not extremely complex.

A primary object of the invention is to provide a simple code requiring a minimum number of check bits to accomplish the detection of all single bit failures; the detection of all asymmetric double bit failures; and the detection of all failures common to all bits wherein the result is that all bits are "-picked" or "dropped."

A further object of the invention is that of providing a checking code wherein the number of check bits required to accomplish the foregoing objects is completely independent of the number of data bits.

Another object of the invention is to provide a means to generate the required check bits with a minimum amount of logic wherein the generation of the double error detecting bit is accomplished by using several logic functions already developed to generate the single error detecting bit.

Still another and further object of the invention is to provide a checking code where the double error detection capability is independent of and in addition to the classical parity check for single error detection. This makes it possible to utilize single error detection capabilities in portions of a data processing system, and double error detection can be added where desired by only the addition of the double error detecting bit. The double error detecting bit is stripped where only single error detecting is desired.

Other and further objects and advantages of the invention and its teachings and principles will become apparent and suggest themselves to those skilled in the art to which it is directed, particularly when considered in conjunction with the accompanying drawings which provide exemplifications of two forms of circuitry which have been found particularly useful.

BY THE DRAWINGS

Figure 2:
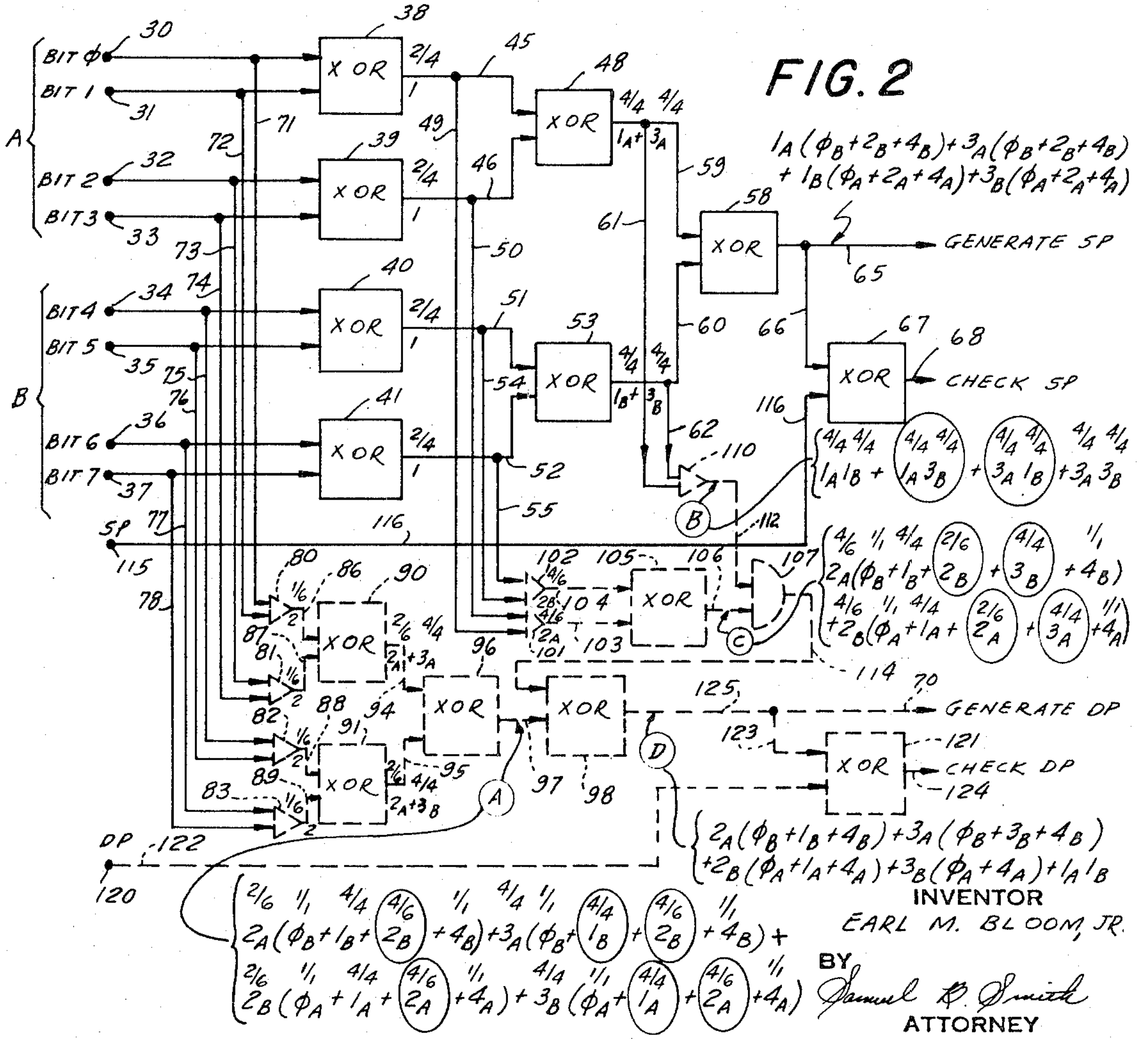
Figure 3:
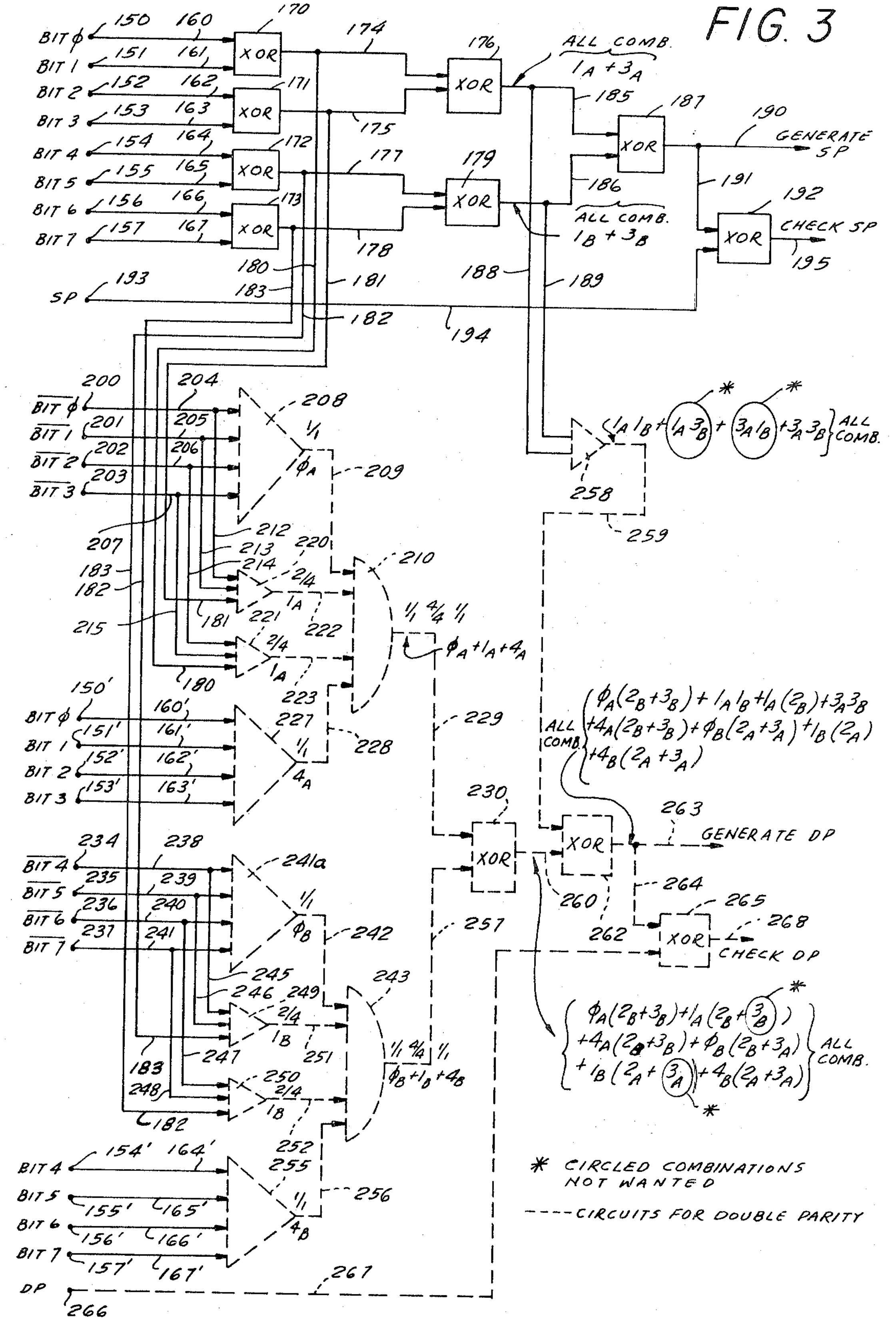

FIG. 1 is a diagrammatic data flow sheet to illustrate a typical environment of the invention;

FIG. 2 is a block diagram showing particularly the circuitry to generate both single and double parity bits, and by the designations placed adjacent to circuit components and conductors shows particularly the Boolean expressions for the signals at different portions of the logic for a general case where *n* data bits are used; and FIG. 3 is also a block diagram of a circuit to generate the logic, and shows like in FIG. 2, another but simpler form of circuitry to achieve the objectives of this invention, with designation shown, as was done by FIG. 2, particularly as adapted to a system using eight data bits.

Referring to the drawings for a further understanding of the invention, and first to FIG. 1, typical data paths are represented in a central processing unit. The data, with the parity bits, is stored in the main storage unit 11 and the general purpose register 12. These data are fed out on the buses 13, 14, and 15; and, as it is transferred on the buses, it is parity checked. The parity bits are stripped from the data operated on by the arithmetic and logic unit, commonly termed "ALU."

Suitable parity bits must be added to the bytes transferred from the ALU, which addition is provided by the parity bit generator shown at 18 so that the data fed into the general purpose register 12 from the ALU can contain the parity bits. Parity check units are shown schematically at 19, 20, and 21.

In reference to FIG. 1 it may be assumed that the loop between the general purpose register (GPR) and the arithmetic logic unit (ALU) utilizes only single error detection and that the loop between the general purpose register (GPR) and the main storage (MS) includes double error detection. Therefore, the general purpose register to arithmetic logic unit (GPR-ALU) loop carries only the single parity detection bit ($S_p$) whereas the general purpose register to main storage (GPR-MS) loop includes the double parity detection bit ($D_p$) as well as the single parity ($S_p$).

As will be seen from a reference to what is to follow in the description of further features of the invention and, for instance, the showing of FIG. 2, later to be set out in more detail, the coding herein to be set forth permits the double parity error detection capability to be added to portions of a data flow by the addition of only one check bit (the double parity—herein also noted at times as the $D_p$) to an existing check bit (that is the classical parity bit for single error detection) as opposed to translating from one checking code to another, which would otherwise be required.

In the understanding of the invention, the block diagrams of FIGS. 2 and 3 are exemplifications of circuitry suitable to its aims and objectives. First referring to FIG. 2, it can be assumed that eight data bits or one byte are supplied to the terminal input points 30 through 37. For convenience of reference these will be considered as constituting bits 0 to 3 and 4 to 7, which, as seen from the figure legends are set up into two groups A and B, each of four separate input bits. This will aid in the understanding of the invention.

These separate inputs feed as the inputs to a group of EXCLUSIVE-OR circuits shown at 38, 39, 40, and 41, with each such circuit having two inputs and, in well-known fashion, providing an output pulse or voltage when one and only one of the two input signals is present, but no output in the absence of both inputs or in the presence of an input signal voltage on both input paths. This general type of circuit is well-known and thus need not be explained in any substantial detail, although they may be further identified in some instances as an AND-NOT-gate-type circuit. The text "Pulse and Digital Circuits" by Millman and Taub, published by McGraw-Hill Book Company, New York, in 1956 fully explains the general nature of this type of circuit, and particularly so at its page 411. Thus, herein the block form of illustration of this and other related circuitry types, such as the normal AND- or the normal OR-circuit also will herein be shown only in block form.

The EXCLUSIVE-OR circuits 38 and 39 feed respectively by conductors 45 and 46 to provide the inputs to EXCLUSIVE-OR circuit 48, while conductors 49 and 50 (other output conductors from EXCLUSIVE-OR circuits 38 and 39) feed into circuitry later to be described. Similarly, the EXCLUSIVE-OR circuits 40 and 41 connect by conductors 51 and 52 to an EXCLUSIVE-OR circuit 53. Likewise, circuits 40 and 41 also supply an output by way of conductors 54 and 55 to still other circuitry which will also later be discussed. Each of these circuits not presently here discussed will be directed to features of the invention wherein double parity pulses are generated.

Input signal pulses for the EXCLUSIVE-OR circuit 58 originate by way of conductors 59 and 60 from the EXCLUSIVE-OR circuits 48 and 53, respectively. As with the circuitry previously discussed, there is also another output from the EXCLUSIVE-OR circuits 48 and 53 which is supplied by way of conductors 61 and 62 to circuitry also to be later discussed.

Output from the EXCLUSIVE-OR circuit 58 is supplied by way of conductor 65 to generate the single parity, and also by conductor 66 into the EXCLUSIVE-OR circuit 67, whose output on conductor 68 is used to check single parity.

Reference might be made at this point to the Boolean expressions shown adjacent to various conductors of this Figure. These Boolean expressions denote the number of logical 1's in a group with the subscripts indicating the particular group (that is, for instance, a showing of such a designation as $1_A+3_A$ is an OR expression of the bit combinations in group A which result in 1 or 3 logical "ones"). From observation of the drawings it will be appreciated that some of the expressions shown by figures and lettering do not contain all bit combinations for a given number of logical "ones." Therefore, the combinations included are shown above the conductors, such, for instance, as the designation 2/4 would indicate 2 of a possible 4 combinations, or a designation 2/6 would indicate 2 out of 6 possible combinations.

The above showings have set out the conditions for single parity, to which further reference will later be made. However, since the main aim and object of this invention is to provide an output which will be conditioned for all possible combinations so that double parity can be realized from the output at point 70 where double parity is available, it is important that it be shown that there shall be circuitry conditioned for all combinations of data bits which result in a total number of logical "ones" equaling 2, 3, 6, or 7. To achieve this objective reference will now be made to that part of the illustrated circuitry which is designated by the dotted or dashed lines and the connections made thereto from the inputs in groups A or B or the outputs from the several EXCLUSIVE-OR circuits which have previously been mentioned.

Specifically, the inputs which are available at input terminal points 30 through 37 are respectively supplied conductors 71 through 78 to the AND-circuits 80 through 83 inclusive. In this respect conductors 71 and 72 provide the inputs to the AND-circuit 80, the conductors 73 and 74 provide the inputs to AND-circuit 81, and so on. The outputs of the four AND-circuits 80 through 83 shown are supplied by way of conductors 86 through 89 into EXCLUSIVE-OR circuits 90 and 91.

The outputs from the EXCLUSIVE-OR circuits 90 and 91 energize the input connections 94 and 95 leading to the EXCLUSIVE-OR circuit 96. An output connection by conductor 97 from the EXCLUSIVE-OR circuit 96 provides input to the EXCLUSIVE-OR circuit 98, which is also controllable from certain of the connections heretofore noted and stated to be for later discussion. So considered, the output pulses or voltages from the EXCLUSIVE-OR circuits 38 through 41 are connected, as also above noted, through conductors 49, 50, and 54 and 55. These conductors are paired with conductors 49 and 50 providing the input to AND-circuit 101, and conductors 54 and 55 providing the inputs to AND-circuit 102.

These AND-circuits 101 and 102 have their outputs connected to energize by way of conductors 103 and 104, respectively, another EXCLUSIVE-OR circuit 105 whose output on conductor 106 provides one input to the OR-circuit 107. The other signal input to OR-circuit 107 is derived from the outputs of the EXCLUSIVE-OR circuits 48 and 49 connected by way of already mentioned conductors 61 and 62 to provide the input to the AND-circuit 110, whose output on conductor 112 provides the second input to the OR-circuit 107. This last-named circuit provides through conductor 114 the second input to the EXCLUSIVE-OR circuit 98.

At this point the consideration of the introduction of both single and double parity now becomes significant. The single parity pulse or bit is provided as an input at terminal point 115 and then through conductor 116 furnishes the second input to the EXCLUSIVE-OR circuit 67 where a single parity check becomes available on conductor 68.

The double parity check bit or pulse is introduced at terminal 120 and supplied into the EXCLUSIVE-OR circuit 121 by conductor 122. EXCLUSIVE-OR circuit 121 also receives the output from the EXCLUSIVE-OR circuit 98 by way of the conductor 123. The double parity check is then available on conductor 124.

Here one should bear in mind that at point D on conductor 125 the output of the EXCLUSIVE-OR circuit 105 should be conditioned for all combinations of data bits which result in a total number of logical "ones" equaling 2, 3, 6, or 7, and this is where the double parity is derived.

In considering the overall logic for the generation of double parity, this results in the output of the EXCLUSIVE-OR circuit 96 on conductor 97 (also designated point A) where it will be recognized that this signal by itself is incorrect. This is because some expressions are incomplete. Illustratively, the pulse $2_A$ covers only two of six combinations, as does signal $2_B$. Further than this, some expressions available are unwanted, such as $2_A2_B$, $3_A2_B$, $2_B2_A$, $3_B2_A$,$3_A1_B$, and $3_B1_A$. Then, also, some expressions, such as $1_A1_B$, $3_A3_B$, are missing completely.

Due to the fact that the signal on conductor 97 at point A is not correct, of itself, it is necessary to consider the effects of signals B on conductor 112 at the output of the combining circuit 110 and the signal on conductor 106, also called the C signal, at the output of the EXCLUSIVE-OR circuit 105. Signal B will pick up the expressions missing from signal A ($1_A1_{BA}$, $3_A3_B$) and will also negate two of the unwanted expressions in signal A, (namely, $1_A3_B$, $3_A1_B$).

Signal C, which is that available on conductor 106 at the output of the EXCLUSIVE-OR circuit 105, will provide other results. By it, certain incomplete expressions will be made complete in the four of six combinations which are missing at signal A. These are from the missing $2_A$ and $2_B$ in signal A which will be generated by signal C. The additional unwanted expressions will be negated in signal A by identical expressions in signal C ($2_A2_B$, $3_A2_B$, $2_B2_A$, and $3_B2_A$).

From the foregoing it can readily be recognized the output signal D comprises all unique expressions which are included in the signals available at points A, B, and C. If reference is made to FIG. 2 of the drawings, the expressions which are available at each of the designated points are shown. By this FIG. there is shown both the expressions used to blank the unwanted combinations in the signal available at point A and also the expressions which are not wanted. In each instance, the drawing shows these conditions by the circled expressions, but it may be mentioned that those expressions of the signals available at the point A are those which are unwanted, and those which are circled as the outputs available at points B or C are those which are used to blank the unwanted ones at point A. Thus, the figure shows the various expressions which are available and shows how they are used in all instances so that any further discussion would be needless at this point, and all that is required for a full and complete understanding is the resolution of the various Boolean expressions and the statement herein made as to how the various expressions are used in the combinations shown and used for the derivation of the conditions desired.

It might be remarked at this point that charts can readily be prepared for each of the points A, B, and C to represent the combinations conditioned and the Boolean expressions for the signal including the number of combinations covered in each expression, but it is thought in view of what is shown by FIG. 2 and what is above explained that this is here unnecessary to a full and complete understanding of the invention since such charts readily follow from the foregoing. Likewise, generally similar charts can be prepared for the Boolean expressions for signal D. Thus, this likewise is not shown.

If reference is now made to the showing of FIG. 3 of the drawings, there will be noted an alternative method of generating the double parity bits which require five fewer circuits than those which are required for the form of the invention diagrammed by the circuit of FIG. 2. Further, it will be observed from a consideration of FIG. 3 that the logic is somewhat simplified and, in many respects, even more straightforward than that already discussed above in respect of the circuitry of FIG. 2.

Considering now particularly FIG. 3, the same eight bits 0 through 7 are shown as applied to terminal points 150 through 157 and then, through conductors 160 through 167, respectively, providing the inputs to the EXCLUSIVE-OR circuits 170 through 173. On these conductors 160 and 162 signal bits 0 and 1 provide the input to EXCLUSIVE-OR circuit 170; bits 2 and 3, through conductors 162 and 163, provide the input to EXCLUSIVE-OR circuit 171. Bits 4 and 5 are similarly connected to conductors 164 and 165 to energize and provide the input to EXCLUSIVE-OR circuit 172 and, lastly, bits 6 and 7 provide the input signals to EXCLUSIVE-OR circuit 173.

The outputs of the EXCLUSIVE-OR circuits 170 through 173 feed two EXCLUSIVE-OR circuits 176 and 179 through conductors 174 and 175 for circuit 176 with conductors 177 and 178 providing the input for circuit 179. Thus, it can be seen that this is generally similar to circuits 38 through 44 feeding their outputs into the EXCLUSIVE-OR circuits 48 and 53 of FIG. 2. There are also other outputs from the EXCLUSIVE-OR circuits 170 through 173 by way of conductors 180, 181, 182, and 183, respectively, for the double parity connections, and the connections thereof to the remainder of the circuit will later be described.

From the designations adjacent to the output conductors 185 and 186 for the EXCLUSIVE-OR circuits 176 and 179, respectively, it will be noted that pulses representing all combinations of $1_A$ or $3_A$ according to the well-recognized and usual Boolean principles, where the plus signs signify that the quantity present is one or the other, will be present. Similar combinations of $1_B$ or $3_B$ are present on the conductor 186 constituting the output of the EXCLUSIVE-OR circuit 179.

These signal pulses then form the inputs to the EXCLUSIVE-OR circuit 187 which, on conductor 190, provides for the generation of the single parity pulses or bits. The single parity bit is connected to be supplied at terminal 193 and by conductor 194 to provide the second input to the EXCLUSIVE-OR circuit 192. The other input is derived from the output of the EXCLUSIVE-OR circuit 187 by way of conductor 191, and the output on conductor 195 is the single parity check.

In a fashion similar to the second outputs from the EXCLUSIVE-OR circuits 48 and 53 of FIG. 2, the EXCLUSIVE-OR circuits also provide a second output series of pulses (of a characteristic like that shown by the designation adjacent to the conductor) which are available on conductors 188 and 189. These conductors feed to a portion of the circuit that will be used for the double parity connections, as also will later be explained.

Further than this, the outputs from the EXCLUSIVE-OR circuits 170 through 173 are also supplied for producing the double parity check by way of conductors 180 through 183, as already mentioned. For this purpose the signal or bit pulses 150 through 157 representing the eight data bits of the message are also supplied at terminal points marked, for instance and convenience of identification, by primed numbers as 150' through 153' and 154' through 157'. In addition, pulses or bits of opposite polarity in the form of "not bits" such as "not-bit-0" or "not-bit-1" and so on at terminals 200 through 203 for the "not bits" 0 through 3, and at terminals 234 through 237 for the "not bits" 4 through 7. Thus, the bit polarity at terminals 200 through 203 and terminals 234 through 237 is of opposite polarity to that at terminals 150' through 153' and 154' and 157', respectively. Of course, the polarity of the bit pulses at these points should be treated as herein later described.

In the obtainment of the double parity check the "not" bit pulses at terminals 200 through 203 are supplied through conductors 204 through 207 as inputs to the AND-circuit 208. The same pulses are also supplied to the AND-circuits 220 and 221 by providing the pulses on conductors 204 and 205 as two of three inputs to the circuit 220, and the pulses on conductors 206 and 207 provide two of the three inputs to the circuit 221. The third input to circuit 221 is the 0 to 1 pulse which is present on conductor 174, while the third input pulse applied to circuit 220 is the 2 or 3 pulse present on conductor 175.

The resulting outputs of circuit 220 and 221 provides two more inputs via conductors 222 and 223 to the OR-circuit 210. A further input to the combining circuit 210 is derived from the bit pulses 0 through 3, as available at the input terminals 150' and through 153', as supplied by way of conductors 160' through 163' which feed the supplied bit pulses into the AND-circuit 227 whose output on conductor 228 connects to the OR-circuit 210. The signal bits available on each conductor leading to the circuit 210, the designations below the conductors showing, as they did in FIG. 2, the number of logical "ones" in a group. As was true with the FIG. 2 circuit some expressions do not include all bit combinations for a given number of logical "ones." This feature and method of marking has already been explained relative to FIG. 2.

The various expressions at the output of the circuit 210, as adjacent to the conductor 229 show the combinations there available, as well as those which are possible. The conductor 229 supplies one input to the EXCLUSIVE-OR circuit 230. The second input will later be explained.

This second input is derived from four original sources, as was the first input from conductor 229.

First of all, "not bits" 4 through 7 are supplied from terminals 234 through 237 by way of conductors 238 through 241 into AND-circuit 241*a* whose output on conductor 242 connects to circuit 243. These same signal bits also supply two of three inputs to AND-circuits 249 and 250, with the "not" bits 4 and 5 being supplied from conductors 238 and 239 and conductors 245 and 246, respectively, as two of the three input pulses into the circuit 249. The third input pulse is provided by way of conductor 183 from the output of the EXCLUSIVE-OR circuit. The output pulse from circuit 249 is then supplied by conductor 251 to the OR-circuit 243.

The circuit 250 is similarly controlled. The bit pulses of "not bits" 6 and 7 supply signals through conductors 240, 241 and then through conductors 247, 248 to provide two inputs. The third input is the output of EXCLUSIVE-OR circuit 172 as supplied through conductor 182. The output of circuit 250 is then supplied through conductor 252 into circuit 243 as its third input.

The fourth input of circuit 243 is derived from bit signals or pulses 4 through 7 supplied at terminals 154' through 157' (and corresponding to those inputs at terminals 154 through 157) which feed via conductors 164' through 167' into the AND-circuit 255 whose output, available on conductor 256, connects to circuit 243.

The output signal on conductor 257 feeds, with the signal on conductor 229, to provide two input signals to the EXCLUSIVE-OR circuit 230. Then, the output signal pulse from EXCLUSIVE-OR circuit 230 is supplied through conductor 260 as one of two inputs to the EXCLUSIVE-OR circuit 262. The other input to circuit 262 is derived from conductor 259 which supplies the output of the AND-circuit 258. This latter circuit is that which, as above noted, has its input pulses supplied through conductors 188 and 189.

Any signal output from the EXCLUSIVE-OR circuit 262 is available on conductor 263 to generate the double parity (DP) pulse on conductor 263, as indicated. In addition, to check the double parity a double parity pulse or bit is supplied at terminal 266 and reaches the EXCLUSIVE-OR circuit 265 through conductor 267. At the same time, the pulse available on conductor 263 (the double parity pulse) is also supplied to this EXCLUSIVE-OR circuit 265 by way of the conductor 264. At the output conductor 268 the double parity can be checked.

By FIG. 3, as with FIG. 2, the various designations shown adjacent to the output of circuit 258 and conductor 259, and those designations at the input and output of the EXCLUSIVE-OR circuit 262 represent the available signal pulse combination at such points.

Some certain ones of these combinations or signals are not wanted (for reasons already noted) and on the drawings these are circled. The specific reasons for this statement will become readily apparent from what has been stated. When the group is considered as a whole it will be evident from a reconciliation of all of the legended Boolean expressions that the form of FIG. 3 circuitry provides outputs which coincide with those of FIG. 2, but on a modified and generally simpler form of circuit.

To aid in identifying and distinguishing between double and single parity circuitry the former is illustrated in dash lines as representing a form which can be readily followed, while the single parity is shown by solid lines. It should be borne in mind, however, that all parts of the circuit shown are always present and should be so regarded even though the illustration has endeavored to make the distinction between the two forms of parity more evident than would all solid outlines.

From the foregoing description it will have become apparent that this invention as disclosed and described makes it readily possible to go from single parity to double parity error detection by circuitry having only two distinct checking bits, as opposed to what was heretofore known where some particular relationship and significant circuit changes were required for such purposes. This factor, of course, makes for substantially cheaper circuitry, as well as readily adopting the teachings of this disclosure for the detecting of double parity errors for *n* data bits.

Other and various modifications may readily be made in the circuitry when the teachings and principles here defined and set forth are used. It is, therefore, to be understood that all such modifications which fairly fall within what is here set forth represents the inventive contribution and should be so recognized when within the scope of the claims to follow.

Having now described the invention, what is claimed is:

1. An apparatus of the type in which data is stored, transferred over data paths, and processed in the form of a byte having a predetermined plurality of binary data bit positions together with one single parity bit position and on double parity bit position, wherein the apparatus is characterized by means for detecting all single and all asymmetric double parity errors comprising, a first circuit means, including a plurality of logical circuits connected to one of the data paths, and responsive to all data bit positions in a byte and to the single parity bit position for detecting a change in an odd number of the data and single parity bit positions, and circuit means, including certain of said logical circuits, connected to said one data path, and responsive to the value of the logical bits in the data bit positions in the double parity bit position for detecting an asymmetric change by the count of two of the logical one bits in those positions.

2. An apparatus of the type in which data is stored, transferred over data paths, and processed in certain locations therein in the form of a byte having a predetermined plurality of binary data bit positions together with one single parity bit position and one double parity bit position and in which data is processed in other locations therein in the form of a byte having only said data bit positions, wherein the apparatus further comprises a first bit generating means, including a plurality of logical circuits connected to one of the data paths, and responsive to the values of the binary bits in each data bit position of bytes in said other locations for selectively adding check bits in the single parity bit positions of the bytes, a second bit-generating means, including certain of said logical circuits, connected to said one data path, and responsive to the values of the binary bits in the data bit positions of bytes in said other locations for selectively adding check bits in the double parity bit positions of the bytes, a single parity error detection circuit including, a first circuit means connected to another of said data paths, logically equivalent to the first bit generating means, having an output and responsive to the bit values in the data positions of a byte to be checked for error in one of said certain locations, a first EXCLUSIVE-OR circuit having a first input connected to the output of the first circuit means and a second input responsive to the bit value in the single parity position of said byte to be checked for detecting all errors occurring in an odd number of data and single parity bit positions of the byte, a double parity error detection circuit including, a second circuit means connected to said other data path, logically equivalent to the second bit generating means, having an output and responsive to the bit values in the data positions of the byte to be checked for error, and a second EXCLUSIVE-OR circuit having a first input connected to the output of the second circuit means and a second input responsive to the bit value in the double parity bit position of said byte to be checked for detecting single bit errors occurring in the double parity bit position, and all double bit asymmetric errors occurring in the data and single parity bit positions.

3. In a data-manipulating system wherein first electrical circuit means operates upon information in the form of bytes each of which has a predetermined plurality of binary data bit positions and wherein means are provided for transferring said information over data paths between said electrical circuit means and additional electrical functional units, the combination with said first electrical circuit means and said additional electrical functional units of means providing single and double parity bit positions for bytes transferred from said electrical circuit means to permit the detection of subsequent errors in the bytes, and means for detecting all errors which occur in an odd number of data and single parity bit positions of the byte to be checked, all single and asymmetric double errors occurring in the data, single parity and double parity bit positions of said byte to be checked and most errors which occur in an odd number of data, single and double parity bit positions and most asymmetric errors which occur in an even number of data, single and double parity bit positions of a byte to be checked, said last-mentioned means comprising, a first bit-generating means, including a plurality of logical circuits connected to one of said paths, and responsive to the values of the binary bits in each data bit position of bytes requiring parity bits for selectively adding check bits in the single parity bit positions of the bytes, a second bit-generating means, including certain of said logical circuits, connected to said one path, and responsive to the values of the binary bits in the data bit positions of bytes requiring parity bits for selectively adding check bits in the double parity bit positions of the bytes, a single parity error-detection circuit including, a first circuit means connected to another of said paths, logically equivalent to the first bit generating means and responsive to the bit values in the data positions of a byte to be checked for error, and a first EXCLUSIVE-OR circuit having a first input connected to the output of the first circuit means and a second input responsive to the bit value in the single parity position of said byte to be checked for detecting certain of said detectable errors, and a double parity error-detection circuit including, a second circuit means connected to said other path, logically equivalent to the second bit generating means and responsive to the bit values in the data positions of a byte to be checked for error, and a second EXCLUSIVE-OR circuit having a first input connected to the output of the second circuit means and a second input responsive to the bit value in the double parity bit position of said byte to be checked for detecting certain of said detectable errors.

4. An asymmetric error-detection system wherein message data transferred over a data path in the form of binary bits are accompanied by an additional bit for detecting single parity errors and a further bit for detecting double parity errors, which includes, circuit means including logical circuits connected to the data path to respond to all of the message data bits, means, including certain of said logical circuits, connected to the data path, and further responsive to the single parity bit for detecting a change in an odd number of the detected data bits and the single parity positions, and circuit means, including certain of said logical circuits, connected to the data path, and further responsive to the double parity bit for detecting all asymmetric errors by the count of two and thereby determining double parity errors.

5. A data-storage system including circuitry connected to data paths and responsive to a selected plurality of binary data bits together with an additional single and an additional double information bit applied to said paths, in which the data bits are separately processed, which comprises, means including a plurality of logic circuits connected to one of the paths and controlled by the values of the separate processing of the data bits for adding selectively check bits in the single parity bit positions, means including certain of said logic circuits connected said one path and controlled by the values of the separate processing of the data bits for adding selectively check bits in the double parity bit positions, detecting means connected to another of said paths for error detection of each of the single parity errors and the double parity errors, each of the said detecting means including logic circuits which are logically equivalent to a respective bit adding means and having an output responsive to the bit values and the data positions to be checked for each of the single parity errors and the double parity errors so that errors occurring in an odd number of data bits and single parity bit positions are detected in one circuit and so that double asymmetric errors are detected in the other circuit.

6. The system claimed in claim 5 wherein the detecting means comprise, a first EXCLUSIVE-OR circuit having one input responsive to the output of one of the logic circuits and the other input responsive to a bit value in the single parity bit position to detect all errors in an odd number of data bits and single parity bit positions, and a second EXCLUSIVE-OR circuit having one input connected to another of the logic circuits and a second input connected to a bit value in the double parity bit position to detect all double asymmetric errors.

* * * * *